United States Patent
Go et al.

(10) Patent No.: US 8,584,146 B1
(45) Date of Patent: Nov. 12, 2013

(54) COMMUNICATIONS DRIVER MANAGEMENT

(75) Inventors: Jared Go, Santa Clara, CA (US); Aron B. Hall, Palo Alto, CA (US); Wen Shu Tang Lu, Mountain View, CA (US); Annie Ding, Santa Clara, CA (US)

(73) Assignee: Hobnob, Inc., Palo Alto, CA (US)

( * ) Notice: Subject to any disclaimer, the term of this patent is extended or adjusted under 35 U.S.C. 154(b) by 0 days.

(21) Appl. No.: 13/480,058

(22) Filed: May 24, 2012

Related U.S. Application Data

(63) Continuation of application No. 13/470,048, filed on May 11, 2012.

(51) Int. Cl.
*G06F 13/00* (2006.01)

(52) U.S. Cl.
USPC .......................................... 719/321; 719/327

(58) Field of Classification Search
USPC .................................. 719/321, 327
See application file for complete search history.

(56) References Cited

U.S. PATENT DOCUMENTS

| | | | |
|---|---|---|---|
| 7,103,778 B2 | 9/2006 | Kon et al. | |
| 7,225,240 B1 | 5/2007 | Fox et al. | |
| 7,624,391 B2 * | 11/2009 | Boldon et al. | 717/170 |
| 2002/0067504 A1 | 6/2002 | Salgado et al. | |
| 2003/0202408 A1 * | 10/2003 | Chobotaro et al. | 365/200 |
| 2006/0059482 A1 * | 3/2006 | Chamberlin et al. | 717/176 |
| 2007/0100997 A1 | 5/2007 | Hirschman et al. | |
| 2007/0156293 A1 | 7/2007 | Kellzi et al. | |
| 2012/0069366 A1 * | 3/2012 | Heffner et al. | 358/1.13 |
| 2012/0140283 A1 * | 6/2012 | Kim et al. | 358/1.15 |

* cited by examiner

*Primary Examiner* — Andy Ho
(74) *Attorney, Agent, or Firm* — Van Pelt, Yi & James LLP

(57) ABSTRACT

The creation of a virtual network adapter is disclosed. At least one existing network device having an existing driver is discovered. At least one of an existing device-to-driver mapping and an existing driver associated with the existing network device is removed. A new driver capable of communicating with the existing network device using a common set of primitive commands is installed. The new driver is mapped to the existing device. The use of the virtual network adapter is also disclosed.

14 Claims, 18 Drawing Sheets

| Est. Capacity | Rel. Capacity |
|---|---|
| 2.0 Mbit/s | 1.0 |
| 1.0 Mbit/s | 0.5 |
| 0.5 Mbit/s | 0.25 |
| 0.5 Mbit/s | 0.25 |

└─1302  └─1304

Allowed splits with I=0.001, target 0.00001

| Est. and Rel. Capacity | |
|---|---|
| 2.0 Mbit/s | 1.0 |
| 1.0 Mbit/s | 0.5 |
| 0.5 Mbit/s | 0.25 |
| 0.5 Mbit/s | 0.25 |

| Current Sol'n |
|---|
| 0 |
| 0 |
| 0 |
| 0 |

Possible Sol'ns using 1 piece

| | | | |
|---|---|---|---|
| 1.0 | 0.0 | 0.0 | 0.0 |
| 0.0 | 2.0 | 0.0 | 0.0 |
| 0.0 | 0.0 | 4.0 | 0.0 |
| 0.0 | 0.0 | 0.0 | 4.0 |
| 1.0 | 2.0 | 4.0 | 4.0 |

| Est. and Rel. Capacity | | Current Sol'n | Possible Sol'ns using 2 pieces | | | |
|---|---|---|---|---|---|---|
| 2.0 Mbit/s | 1.0 | 1 | 2.0 | 1.0 | 1.0 | 1.0 |
| 1.0 Mbit/s | 0.5 | 0 | 0.0 | 2.0 | 0.0 | 0.0 |
| 0.5 Mbit/s | 0.25 | 0 | 0.0 | 0.0 | 4.0 | 0.0 |
| 0.5 Mbit/s | 0.25 | 0 | 0.0 | 0.0 | 0.0 | 4.0 |
| | | | 2.0 | 2.0 | 4.0 | 4.0 |

*Fractional Split Decision example with target loss 1%*

Allowed splits for L=0.001 target=0.01: (1,1), (2,2), (3,3), (4,4), (5,5), (6,6), (7,7), (8,8)

Round 1: best solution is (1,0) with required time 1.000
Round 2: best solution is (1,1) with required time 1.000
Round 3: best solution is (2,1) with required time 0.667
Round 4: best solution is (3,1) with required time 0.750
Round 5: best solution is (4,1) with required time 0.800
Round 6: best solution is (4,2) with required time 0.667

Global best solution is (2,1) with required time 0.667, representing an increase in capacity of 50% and meeting the target loss of 1%.

FIG. 17A

*Fractional Split Decision example with target loss 0.0001%*

Allowed splits for L=0.001 target=0.000001: (2,1), (3,1), (4,2), (5,3), (6,4), (7,5), (8,6)

Round 1: best solution is (1, 0) with required time 1.000 (ignored since not in allowed splits)
Round 2: best solution is (2, 0) with required time 2.000
Round 3: best solution is (2, 1) with required time 2.000
Round 4: best solution is (3, 1) with required time 1.500
Round 5: best solution is (4, 1) with required time 1.333
Round 6: best solution is (4, 2) with required time 1.000

Global best solution is (4,2) with required time 1.000, representing an increase in capacity of 0% and meeting the target loss of 0.0001%.

FIG. 17B

COMMUNICATIONS DRIVER MANAGEMENT

CROSS REFERENCE TO OTHER APPLICATIONS

This application is a continuation of co-pending U.S. patent application Ser. No. 13/470,048, entitled COMMUNICATIONS MANAGEMENT filed May 11, 2012 which is incorporated herein by reference for all purposes.

BACKGROUND OF THE INVENTION

Individuals increasingly expect the presence of reliable access to the Internet, irrespective of where they are. Unfortunately, individuals can face a variety of challenges in obtaining such access. As one example, the quality of a given connection can vary based on where the individual is physically located. As another example, a particular link may be congested (e.g., due to heavy use by other individuals) resulting in lower available bandwidth.

BRIEF DESCRIPTION OF THE DRAWINGS

Various embodiments of the invention are disclosed in the following detailed description and the accompanying drawings.

FIG. 13 illustrates information used in determining a fractional split.

FIG. 14 illustrates an example of the first iteration of a process for performing a fractional split decision.

FIG. 17A illustrates an example of a fractional split decision made with a target loss of 1.0%.

FIG. 17B illustrates an example of a fractional split decision made with target loss of 0.0001%.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
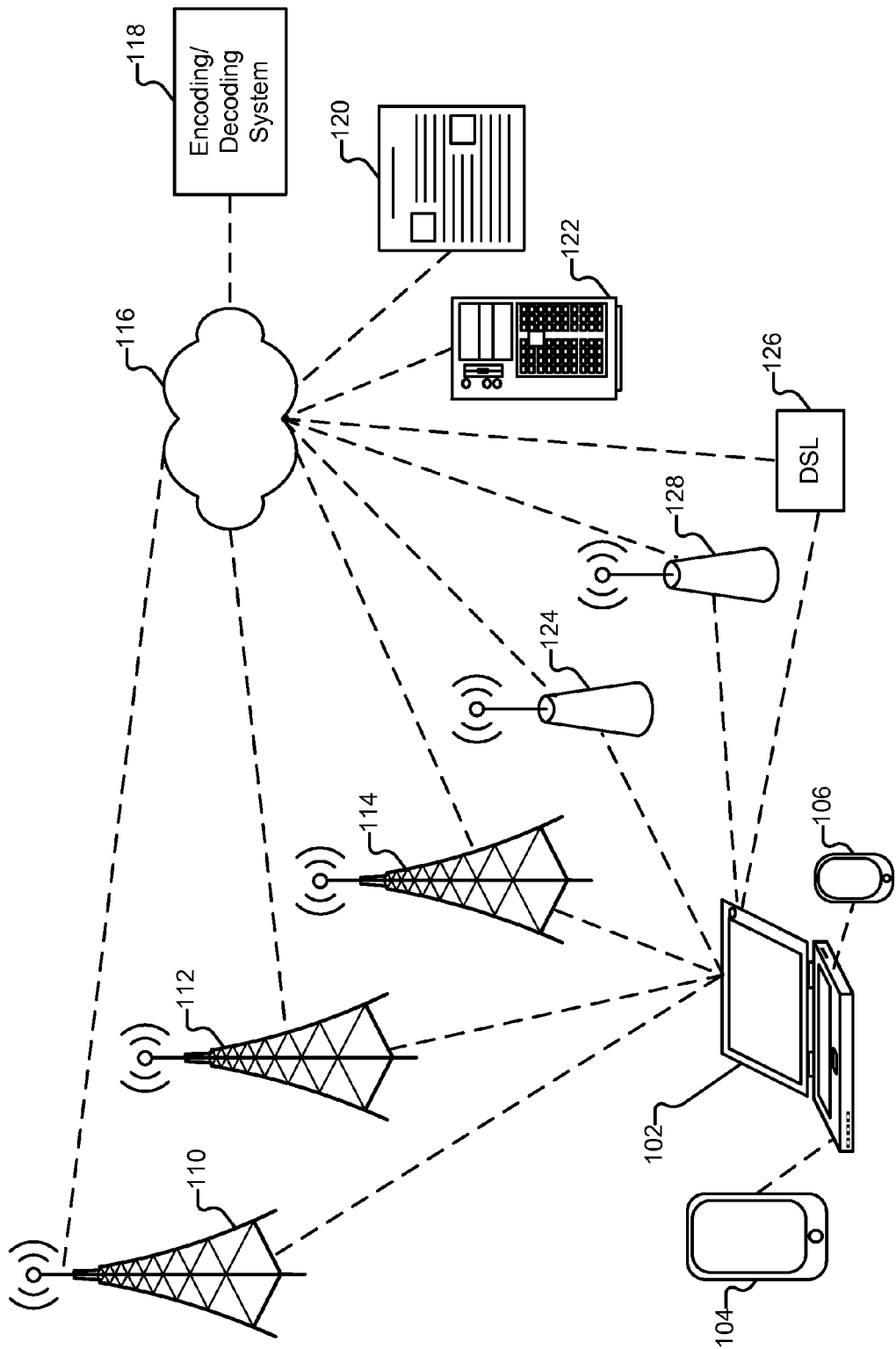
FIG. 1 is a diagram illustrating an embodiment of an environment in which fractional encoding and decoding of packets is performed.

FIG. 1 is a diagram illustrating an embodiment of an environment in which fractional encoding and decoding (also referred to herein as "reconstruction") of packets is performed. In the example shown, client 102 is a laptop computer belonging to an individual hereinafter referred to as "Alice." Alice uses her laptop in a variety of locations, including at her home and at her office. Alice also uses her laptop in other locations, such as: (1) when commuting to and from her office on a train that offers wireless Internet service to passengers; (2) in a hotel room that offers wired Internet connectivity; and (3) in a café near the hotel that offers wireless Internet service. As will be described in more detail below, client 102 includes packet encoding/decoding tools. Client 102 also includes various modems, network adapters, and/or other networking hardware.

In addition to laptop 102, Alice has a tablet device 104 and a smartphone 106. Laptop 102 can be configured to share its network connectivity with additional devices, such as devices 104 and 106. For example, if Alice's laptop 102 has two wireless LAN cards, one can be used to provide connectivity to tablet 104 and the other used to connect to a wireless access point. If Alice has only one wireless LAN card, other networking components present in laptop 102 can be used to obtain network connectivity (e.g., via Internet 116) and the sole wireless LAN card can be used to provide connectivity to tablet 104. As another example, if Alice's laptop 102 includes a Bluetooth radio, the Bluetooth radio can be used to share whatever aggregate internet connectivity laptop 102 has with smartphone 106 (which also includes a Bluetooth radio).

Aggregation Overview

Suppose Alice is currently riding on a train commuting to her office. She wishes to connect to server 122 using an application 402 that supports the SSH protocol. Server 122 has an Internet-routable address. Alice also wishes to browse website 120 using a browser application 404. One option for Alice is to use the wireless services provided by the train operator (represented as wireless access point 124 in FIG. 1) to make connections to server 122 and website 120. Using the techniques described herein, Alice can also aggregate any additional connectivity she might have (e.g., via a removable 3G USB modem) to improve her experience, such as by increasing her bandwidth and/or by increasing the reliability of her connections with server 122 and website 120.

Now suppose that rather than being on a commuter train, Alice is at a hotel that offers DSL services through a wired connection in her hotel room. Alice could use the wired services provided by the hotel to connect to server 122 and website 120. Using the techniques described herein, Alice can also aggregate any additional connectivity she might have, such as may be provided by the 3G USB modem, and/or such as through an open wireless access point 128 operated by a café that is within range of her hotel room.

Fractional Packet Overview

As will be described in more detail below, packets associated with applications installed on client 102, such as applications 402 and 404, are transformed into fractional packets and transmitted across one or more available links. Examples of such links are connections made between client 102 and infrastructure 110-114 provided by respective wireless carriers. As one example, infrastructure 110 can be provided by a carrier such as Verizon Wireless (e.g., supporting 3GPP Long Term Evolution communications). Infrastructure 112 and 114 and any additional infrastructure can be provided by other carriers (e.g., Sprint Nextel Corporation) and support other forms of communications (e.g., EDGE or WiMAX). A given infrastructure typically comprises multiple nodes in multiple locations, but is depicted in FIG. 1 for conciseness as a single tower. Other examples of links include connections made between client 102 and wireless access points 124 and 128; between client 102 and any wired infrastructure, such as a DSL router 126 located in a hotel; and between client 102 and a portable wireless hotspot (not shown).

The fractional packets are ultimately received by system 118 (which is located, e.g., at a data center or a head end of a service provider), which reconstructs client 102's packets from the fractional packets and routes the resulting reconstructed packets to their appropriate destinations (e.g., network nodes 120 and 122). Any return traffic intended for client 102 (e.g., from nodes 120 and 122) is routed to system 118 which fractionally encodes the return traffic and causes it to be routed to client 102. On client 102, the fractional packets are decoded and the recovered information is provided to the SSH and browser applications, as applicable. While both client 102 and system 118 are both capable of both encoding and decoding fractional packets, for conciseness, the examples described herein will generally reference the encoding of packets by client 102 and the decoding of packets by system 118.

Client Device

Figure 2:
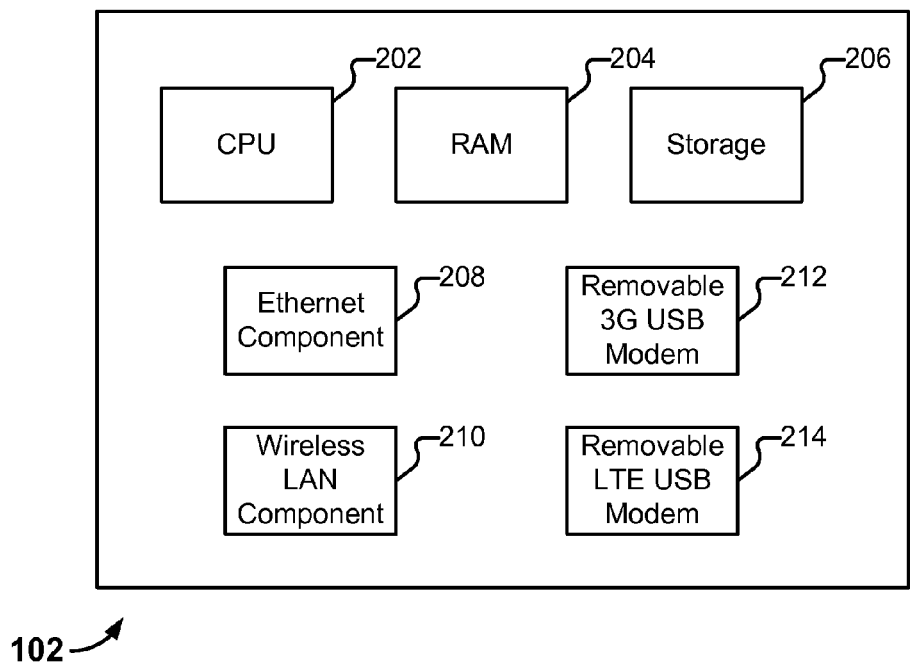
FIG. 2 illustrates an embodiment of a client device.

FIG. 2 illustrates an embodiment of a client device. In the example shown, client device 102 is a commodity laptop computer comprising typical hardware elements and a variety of consumer-oriented wireless cards. In particular, client 102 includes a CPU 202, RAM 204, and storage 206 (such as one or more hard disks). Other components, such as a display and one or more input interfaces, can also be included, as applicable. In the examples described herein, client 102 runs an operating system provided by Microsoft Corporation, such as Windows 7. Clients running other operating systems can also be used and the techniques described herein adapted as applicable.

Also included in client 102 are a variety of networking components 208-214 that facilitate network communications. Such networking components can be fixed (e.g., integrated into client 102 at the time of manufacture or added as a hardware upgrade). Such networking components can also be removable (e.g., insertable by a user into a slot such as a USB, PCMCIA, ExpressCard, MiniPCI, MiniPCI Express, and/or any other appropriate peripheral interfaces). In various embodiments, any of networking components 208-214 are omitted and/or additional networking components are included.

As shown, client 102 includes a commodity Ethernet component 208 and a commodity wireless LAN component 210. Client 102 also includes two off-the-shelf consumer wireless cards 212-214. Removable 3G USB modem 212 is sold by the carrier that provides infrastructure 110 (hereinafter "Carrier A"). Alice has a postpaid data plan with Carrier A which allows her to use unlimited data (at up to 3G speeds) for $50 per month. Removable LTE USB modem 214 is sold by the carrier that provides infrastructure 112 (hereinafter "Carrier B"). Alice has a prepaid plan with Carrier B whereby each Gigabyte of data costs her $15. When Alice has access to wired Ethernet services (e.g., when she is at her office or at a hotel), Ethernet component 208 can provide Alice with network connectivity (whether for free or for a fee). Similarly, when Alice is in range of a suitable access point, wireless LAN component 210 can also provide Alice with network connectivity. As will be described in more detail below, the network resources made available via networking components 208-214 (or other appropriate networking components) can be aggregated using a virtual network adapter. In some embodiments, the aggregated resources will appear to client 102 as a single layer two connection.

Creating a Virtual Network Adapter

Figure 3:
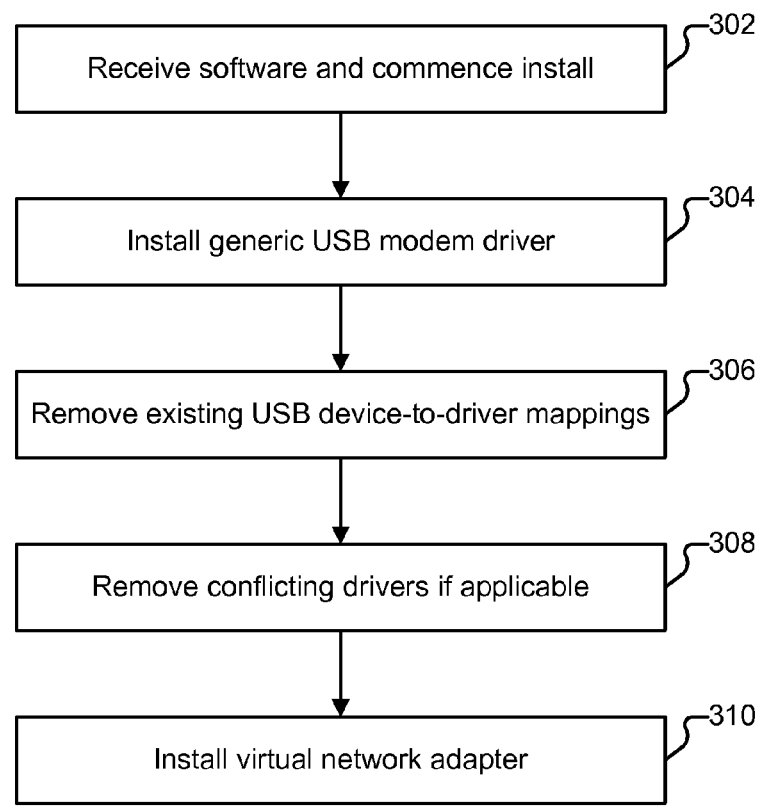
FIG. 3 illustrates an embodiment of a process for creating a virtual network adapter.

FIG. 3 illustrates an embodiment of a process for creating a virtual network adapter. In various embodiments, the process shown in FIG. 3 is performed on client 102. Whenever client 102 is described as performing a task, a single component, a subset of components, or all components of client 102 may cooperate to perform the task. Similarly, whenever a component of client 102 is described as performing a task (e.g., application 406), a subcomponent may perform the task and/or the component may perform the task in conjunction with other components.

Process 300 begins at 302 when installer software is received. The installer software can be received in a variety of ways. For example, the installer software can be bundled with a networking component, such as by being included on removable USB modem 212. When Alice inserts the USB modem the first time, she is prompted to install the installer software, which is received at 302 by client 102. As another example, Alice could download the installer software from a website using browser application 404.

When the installer software is executed, a client application is copied to an appropriate location on client device 102 (e.g., a directory on storage 206). The client application is also referred to herein as communication aggregation application 406. The installer software also, at 304, installs a generic USB modem driver. One example of such a driver is built as a lightweight wrapper around the "WinUSB" generic driver provided by Microsoft Corporation. Associated with the generic USB modem driver is a .INF file that maps particular devices to the generic USB modem driver (e.g., via a vendor ID and product ID associated with the device). For example, identifiers corresponding to 3G USB modem 212 and LTE USB modem 214 are both present in the .INF file and map those modems with the generic USB driver.

In some cases, existing drivers for devices such as modems 212 and 214 may already be present on client 102. For example, Alice may have been using the modems for some time prior to downloading the installer software. The generic USB modem driver installed at 304 has properties which in some cases give it priority over the previously installed drivers by the operating system. For example, the .INF file may contain a "Feature Score" directive which increases the priority of the driver as computed by Microsoft Windows. However, in some cases, additional processing (306-308) may be needed to successfully map USB network devices 212-214 with the generic USB driver. One approach is to remove any existing USB device-to-driver mappings (306). In this approach the existing driver is not removed—just the mapping (e.g., the entry in the .INF file). A second approach is to remove any conflicting drivers (308) from client 102. In various embodiments, Alice's permission is requested by the installer software prior to actions 306 and/or 308 being taken. As one example, Alice can be informed that an existing driver is about to be uninstalled, and asked whether she would like to save a backup copy of the driver prior to its removal.

Based on the USB specification, a given device may be composed of multiple interfaces which are in turn composed of multiple endpoints. Some operating systems will treat such a device as a single device. Other operating systems operate at the interface level, meaning that when such a device is plugged in, each of the multiple interfaces will appear to be a separate device (sometimes referred to as a "composite device"). In some embodiments, the installer software is configured to prevent a multiple-interface device from being treated by the operating system as multiple devices—instead installing a driver for the base device, only.

Finally, at 310, the virtual network adapter is installed.

Figure 4:
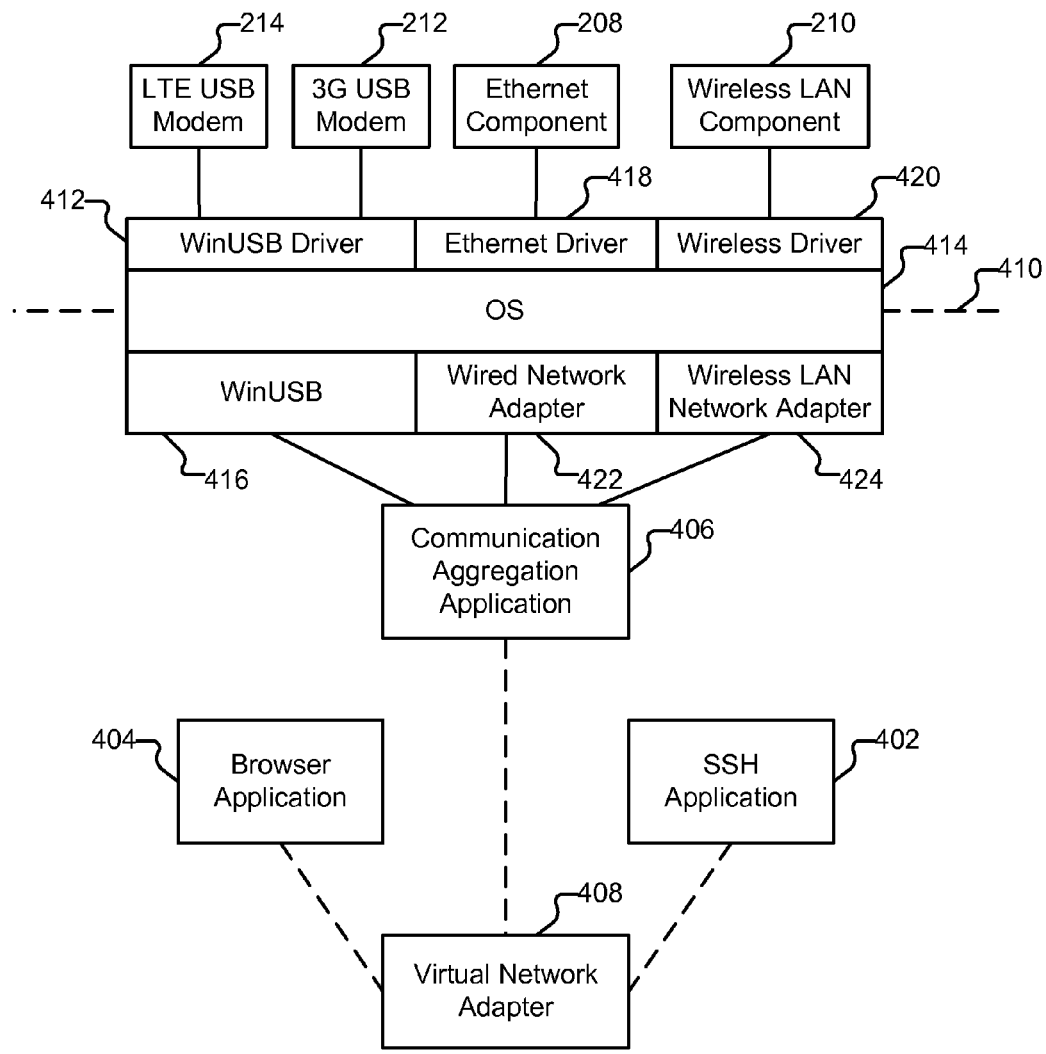
FIG. 4 is a conceptual diagram that illustrates an example of a client after a communication aggregation application and a virtual network adapter have been installed.

FIG. 4 is a conceptual diagram that illustrates an example of client 102 after a communication aggregation application and a virtual network adapter have been installed. Dotted line 410 represents a conceptual division between kernel space (above the line) and user space (below the line). As shown, network components 214 and 212 are handled by operating system 414 using the wrapped WinUSB generic driver 412. Operating system 414 exposes a WinUSB endpoint 416 that applications such as communication aggregation application 406 can bind to. Ethernet component 208 and wireless LAN component 210 have their own respective drivers (418 and 420) and are also exposed by operating system 414 for use by applications (via respective adapters 422 and 424).

Using the Virtual Network Adapter

Figure 5:
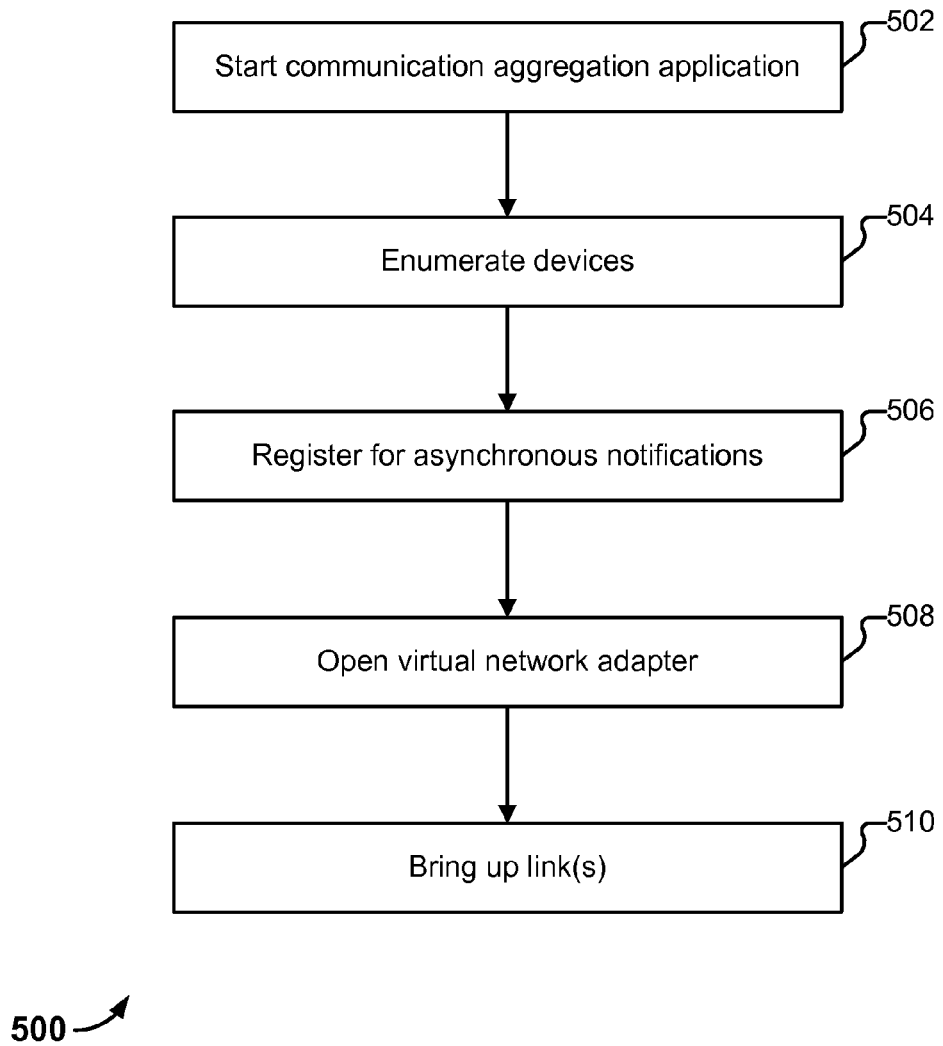
FIG. 5 illustrates an embodiment of a process for using a virtual network adapter.

FIG. 5 illustrates an embodiment of a process for using a virtual network adapter. In various embodiments, the process shown in FIG. 5 is performed on client 102. The process begins at 502 when communication aggregation application 406 is started. Application 406 can be started in a variety of ways. As one example, application 406 can automatically start whenever client device 102 is turned on. As another example, application 406 can automatically start whenever a removable networking component (e.g., modem 212) is inserted into client 102. As yet another example, application 406 can be started on demand by Alice.

At 504, any networking devices present in client 102 are enumerated. In some embodiments, enumeration is performed by enumerator 712. One way to perform enumeration is to examine the .INF file for the presence on client 102 of any devices included in the file. Ethernet and Wireless LAN devices that are not included in the .INF file but are present in client 102 (e.g., 422 and 424) are also enumerated. One way to perform this enumeration is to scan for the presence of network adapter interfaces (422 and 424) corresponding to devices 208 and 210. Another way to perform enumeration is to consult a device database 702 that includes information on devices previously used by client 102 (which can include both fixed and removable devices). In some embodiments, portion 504 of process 500 is repeated periodically (e.g., every 60 seconds).

At 506, a request is made to register for asynchronous notifications. In some embodiments, the request is made by link manager 732. If any additional networking devices are inserted (and/or turned on), or if any networking devices are removed (and/or turned off), application 406 will be notified accordingly through asynchronous notifications. Such notifications are managed by notification handler 714. In some embodiments, a filter is applied by the notification handler to received notifications so that only changes in status/additions/removals of networking devices of interest (and not, e.g., devices not of interest, such as USB mice) are monitored for. In some embodiments, portion 504 of process 500 is repeated whenever an asynchronous notification involving a network device of interest is received. In some embodiments, portion 506 of the process is omitted. For example, users can be asked to insert all removable devices prior to starting application 406, or can be asked to insert all removable devices after starting application 406. Periodic re-enumeration can also be employed, without using the processing performed at 506.

At 508, the virtual network adapter is opened. Finally, at 510, links such as a connection between client 102 and infrastructure 110 and/or a connection between client 102 and infrastructure 112 are opened. Applications 402 and 404 use virtual network adapter 408 for their network communications. Packets received from those applications via the virtual network adapter are processed by communication aggregation application 406 which in turn causes fractional packets to be sent out over the link(s).

Figure 6:
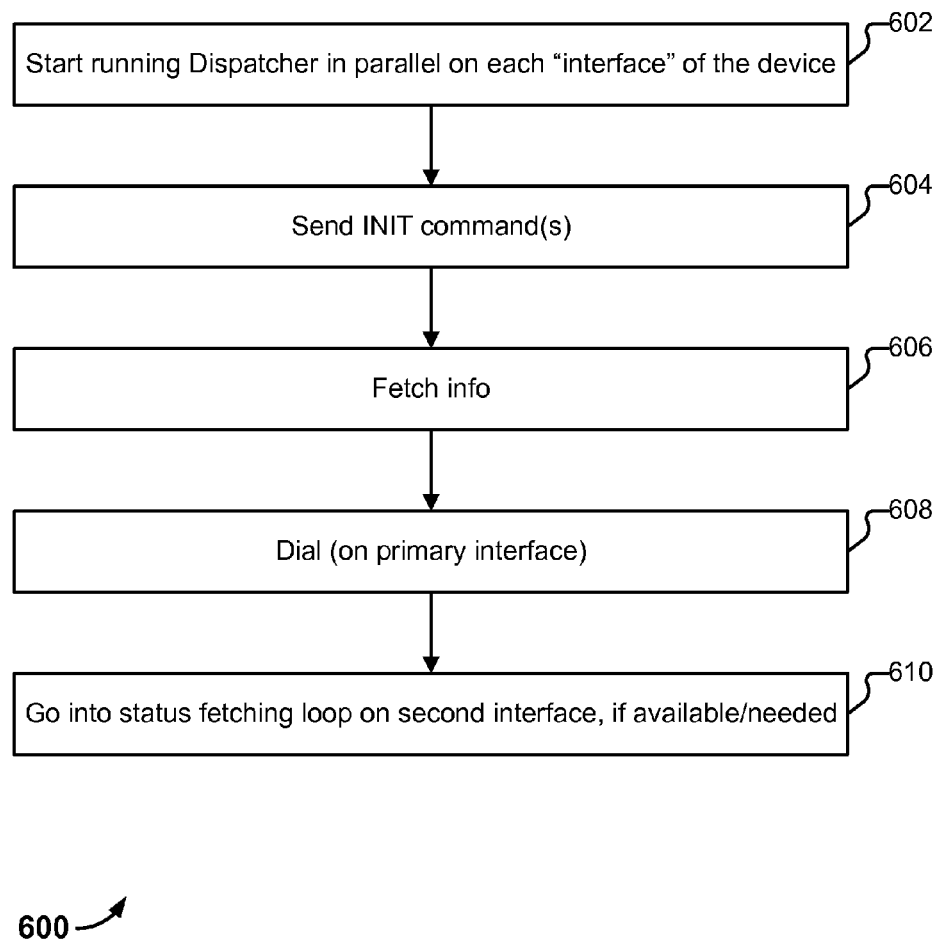
FIG. 6 illustrates an embodiment of a process for bringing up a link.
Figure 7:
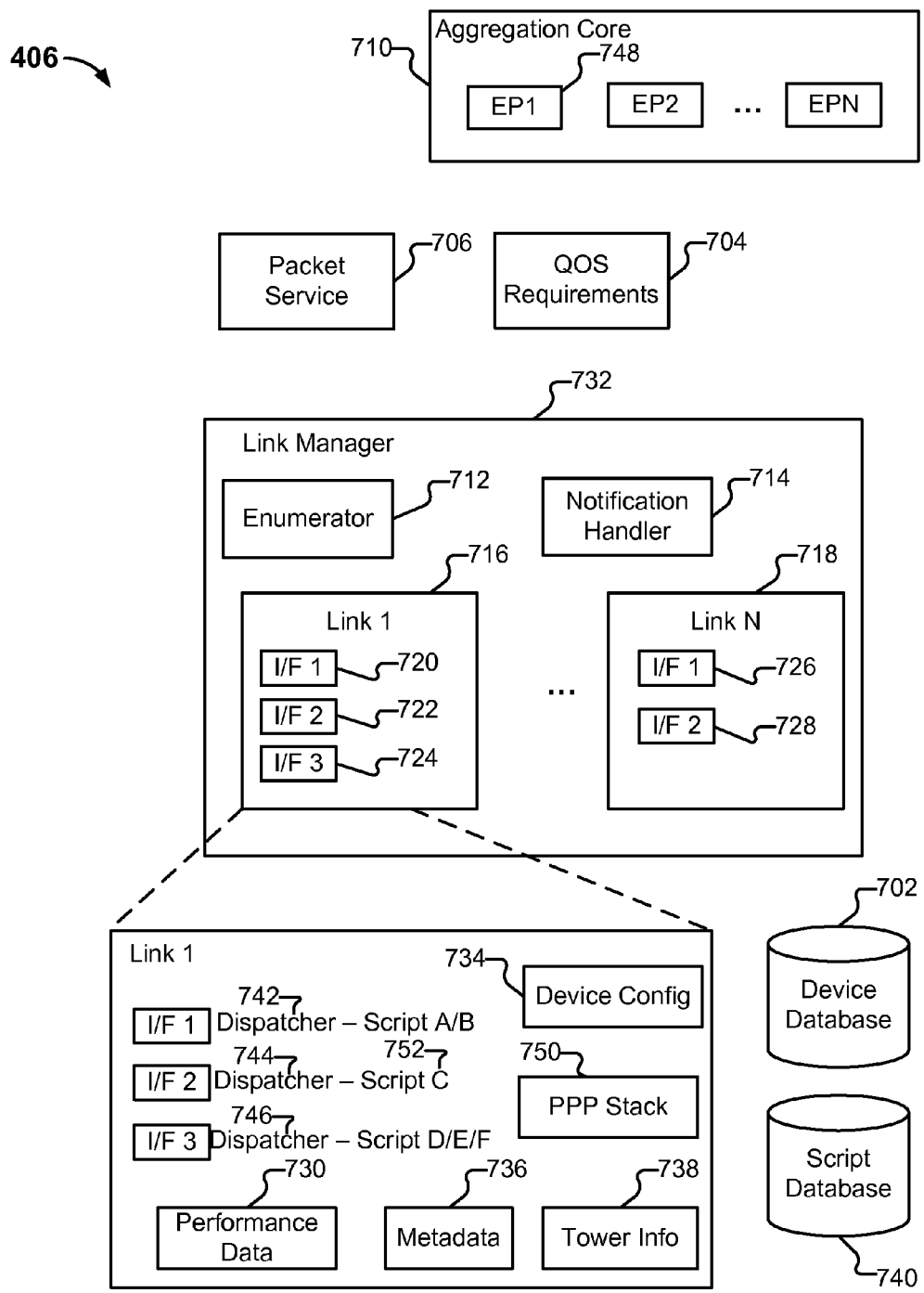
FIG. 7 illustrates components associated with a communication aggregation application in some embodiments.

Additional detail regarding portions of process 500 and regarding components of communication aggregation application 406 is provided in conjunction with FIG. 6, FIG. 7, and the accompanying descriptions of those figures.

FIG. 6 illustrates an embodiment of a process for bringing up a link. In some embodiments, process 600 is performed at 510 in process 500 for each enumerated networking device. In the following discussion of FIG. 6, removable 3G USB modem 212 is used as an example of an enumerated networking device for which a link is brought up.

The process begins at 602 when a Dispatcher is run, in parallel, on each interface of an enumerated networking device. Each Dispatcher is configured to run applicable scripts included in script database 740. Dispatchers perform tasks such as initializing its associated networking device. As will be discussed in more detail below, modem 212 includes multiple interfaces and multiple Dispatchers will be brought up for the device in parallel accordingly. Certain commands (such as "power on radio" or "fetch signal strength") are applicable to all devices. However, each device may have a specific, distinct way of being instructed to execute the command. By using a combination of Dispatchers and device-specific scripts, commands can be issued to devices using a common set of primitives (e.g., a generic "power on radio" instruction) that are then implemented by the implicated Dispatcher/script. Changes can be made to the scripts without requiring a reboot of client 102.

At 604, applicable initialization (INIT) commands are sent. One example is a USB command to turn on a modem. Another example is an AT command to set a variable.

At 606, applicable information is fetched (e.g., from device database or script database 740). Examples of such information include phone numbers and/or settings information.

At 608, the primary interface is instructed to perform a dialing operation. The particular manner in which dialing should be performed on a given device can be specified using device database 702 and script database 740 and any applicable settings (e.g., configuration 734). Typically, irrespective of how many interfaces a device has, only one interface will enter data mode. In some embodiments, that interface is hooked to PPP stack 750.

Finally, as applicable, at 610, a status fetching loop is entered into on a secondary interface. Some networking components have several interfaces. For example, link 716 includes three interfaces (720-724). One interface (e.g., interface 720) is used for dialing. The second interface (e.g., interface 722) is used for initialization. The third interface (e.g., interface 724) is used to monitor signal strength. Other networking components have fewer interfaces. For example, link 718 has only two interfaces (726-728). The first link (726) will be used to send and receive data, leaving the second link (728) the only one available to perform tasks such as checking signal strength or changing settings. The status fetching loop (610) can be employed to use the secondary interface to perform multiple types of tasks. As one example, the Dispatcher associated with the secondary interface can loop through each of the status-related tasks (e.g., determining signal strength, then determining latency). In some embodiments, a background queue is employed so that user-initiated requests (e.g., changes to settings) can be interleaved with the status fetching operations. One way for the Dispatcher to make use of a background queue is for the Dispatcher to yield every five seconds for five seconds to process any items waiting in the background queue.

Some devices provide "unsolicited messages." For example, 3G USB modem 212 may generate a message that it has switched towers, whenever it switches towers. In various embodiments, link manager 732 is configured to monitor for the presence of such unsolicited messages, and place them in a queue for processing, if applicable. For example, if a tower switch message is received from a link, the current tower information (738) is updated accordingly. Other messages may not be of interest to link manager 732 and are dropped or otherwise ignored instead of being added to the queue. Instructions for which unsolicited messages should be processed and which should be ignored can be stored in a variety of places, including as device configuration information 734, in script database 740, or any other appropriate location.

FIG. 7 illustrates components associated with communication aggregation application 406 in some embodiments. The components depicted in Figured 7 can be included within the application and can also be located outside the application but be usable by or work in cooperation with the application as applicable. Whenever application 406 performs a task (such as receiving encoding or decoding a packet), either a single component or a subset of components or all components of application 406 may cooperate to perform the task.

Link manager 732 manages the enumerated links (e.g., links 716 through 718) and is responsible for tracking information such as the current state of each of the links, configuration information (734), metadata (736), which tower the link is connected with (738) if applicable, etc. Enumerator 712 performs enumeration and re-enumeration of devices (described in more detail in conjunction with portion 504 of process 500). Asynchronous notification handler 714 listens for notifications from operating system 414 (described in more detail in conjunction with portion 506 of process 500).

One example of a link is link 716. As previously explained, link 716 includes three interfaces 720-724, each of which has an associated Dispatcher (742-746). In the example shown, suppose link 716 corresponds to 3G USB modem 212. When enumerator 712 enumerates modem 212, link manager 732 determines which configuration information (e.g., 734) and scripts are applicable to the device by consulting device database 702. Link manager 732 then instructs Dispatchers 742-746 to obtain the appropriate scripts (e.g., script 752) from script database 740. As one example, script 752 could be responsible for looping and fetching signal strength for device 212.

Also included in application 406 is aggregation core 710. When a link is brought up (e.g., link 716), a corresponding endpoint (e.g., endpoint 748) is created. When packets are received via virtual network adapter 408, packet service 706 provides the stream of packets to the aggregation core 710, which performs fractional encoding (and decoding) and sends the fractional packets over the various endpoints.

As described in more detail below, for each input packet (received by the packet service from client 102), two parameters n and m are selected, which together define the granularity and redundancy of the fractional encoding. Specifically, for an input packet of size k, an encoder in the aggregation core generates m fractional packets of size k/n such that having any n of the m pieces allows the original packet to be reconstructed. The fractional packets are then sent over the available links to system 118, which is able to rebuild the original packet as soon as it receives the "threshold" number of packets n. In the case where one fractional packet is sent on each available link, the effective bandwidth of the system is n times the bandwidth of the $n^{th}$ fastest link, with significant redundancy added via the m-n extra packets.

Various techniques can be used to create fractional packets from the input packets. In the examples describe herein, the technique used to generate fractional packets is based on Shamir's secret sharing method. However, other cryptographic secret sharing techniques may also be used, as may other techniques, such as Reed-Solomon erasure codes with forward error correction, turbo codes, parity-check codes, convolutional codes, Hamming codes, etc., and the techniques described herein adapted as appropriate.

Additional sources of information can also be used in determining n and m and in the assignment of the resulting fractional packets to links. As one example, link performance data includes information such as the estimated capacity of each link or the loss rate of each link. One source of link performance data includes information provided by the device providing the respective link. For example, link 716 has the ability to report on its signal quality, an example of performance data 730. In some cases, such as a satellite link, link performance may be significantly better in one direction than the other. Application 406 can specify that a satellite link be used only for downlink, while other links are used for uplink, or that only a portion (e.g., 25% of traffic) be sent via the satellite connection.

Quality of Service requirements 704 are specified by a user such as Alice and allow Alice to specify desired link quality targets such as loss rate or latency. For example, if all links are lossy, or if a low packet loss rate is desired, application 406 may determine to reduce n, which makes it more likely that enough data will be received to reconstruct the packet. In various embodiments, Alice is able to configure other goals as well. For example, if client 102 is being used to facilitate a VOIP call, it might be preferable to reduce latency, even at the cost of a higher loss rate. Conversely, if client 102 is making use of TCP, a more stable connection might be preferable. As another example, Alice can specify that she prefers to favor the use of a link associated with a monthly flat rate fee over a pay-by-use link. As another example, if Alice is about to make a critical high definition video call, she may prefer to optimize her aggregate connection for bandwidth and/or reliability, even if it means paying more for the connection.

Figure 18:
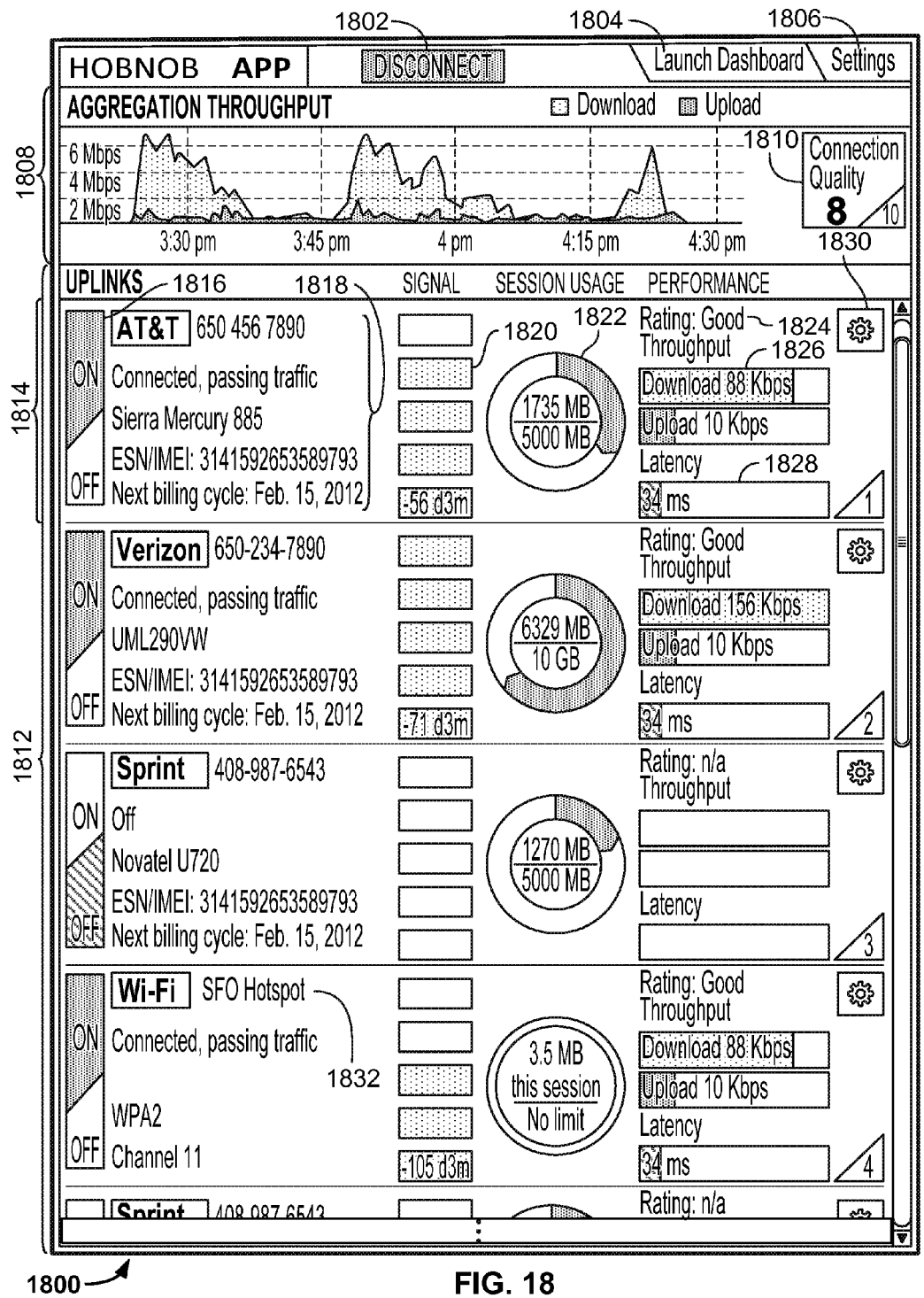
FIG. 18 illustrates an embodiment of an interface for managing aggregate communications.

An example of an interface displaying status to Alice is shown in FIG. 18. As described in more detail below, the link performance data and QOS requirements can change dynamically over time, and other inputs to application 406 can also be used (or omitted) as applicable.

Fractional Encoding

Figure 8:
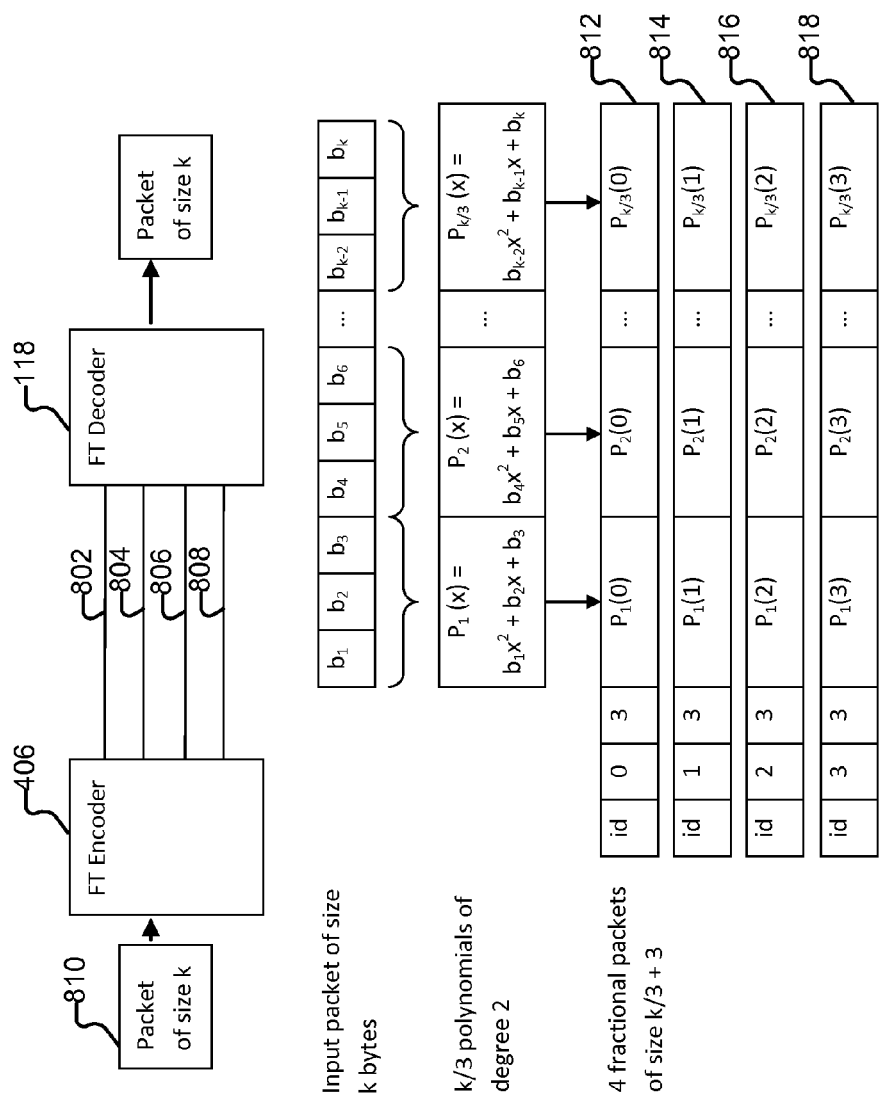
FIG. 8 illustrates an example of fractional threshold encoding according to one embodiment.

FIG. 8 illustrates an example of fractional threshold encoding according to one embodiment. In the example shown, the (3,4) case (i.e., n=3, m=4) is used and Galois Field $2^8$ is used as the computation space. Other fractional splits and fields can also be used, as applicable. Links 802-808 represent the links available to application 406.

The process begins with an input packet (810) of size k, whose bytes are $b_1, b_2, \ldots, b_k$. If k is not a multiple of 3, the buffer is padded with zeroes so that it is. For each consecutive triplet of three bytes (e.g., $v_1$, $v_2$, and $v_3$), a degree 2 polynomial $P_i$ is constructed where the bytes are the coefficients of the polynomial $P_i(x)=v_1x^2+v_2x+v_3$. Since there are three bytes per polynomial, there are $$\frac{k}{3}$$

of these polynomials.

Next, each of the output fractional packets 812-818 is built as follows. For each output fractional packet, a unique sample point (e.g., 0-255) is chosen. In the example shown, zero is used first, and the number is incremented by one for each output packet. The first three bytes of the fractional packet are set to the packet ID, sample point, and the number of packets needed for reconstruction. This data allows system 118 to match up incoming fractional packets and determine when sufficient data has been received to attempt decoding.

The rest of the bytes in the fractional packet come from evaluating each of the $$\frac{k}{3}$$

polynomials at the selected sample point. In the example shown, this results in four output packets each having length $$\left(\frac{k}{3}+3\right)$$

bytes.

Figure 9:
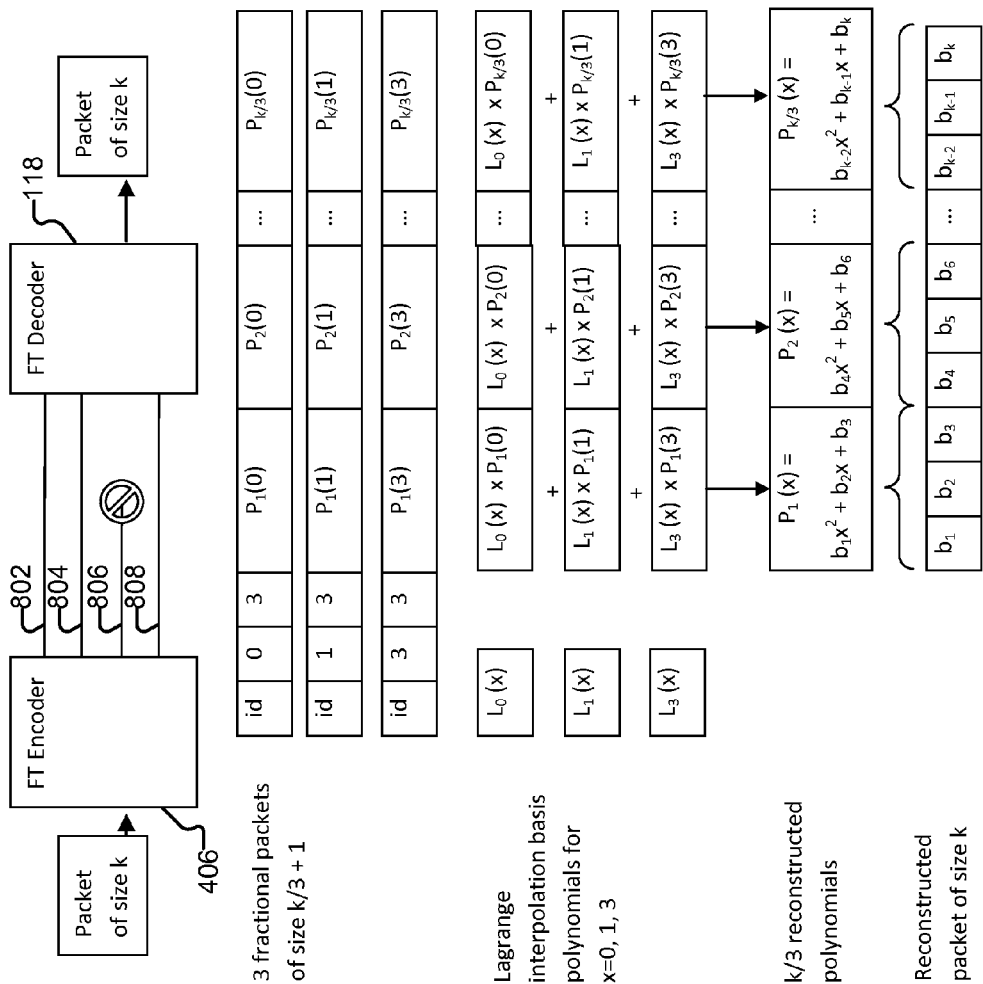
FIG. 9 illustrates an example of fractional threshold decoding according to one embodiment.

FIG. 9 illustrates an example of fractional threshold decoding according to one embodiment.

In the example shown, assume that the fractional packet sent over link 806 has been lost. Accordingly, only three of the four packets sent in the process shown in FIG. 5 are available for reconstruction. As each fractional packet arrives, it is stored in a buffer based on the packet ID. Once three packets corresponding to the same packet ID have been collected, it is known based on the fractional packet headers that a sufficient number of pieces have been received by system 118 to begin decoding.

The process begins by first constructing the unique Lagrange interpolation polynomials for the sample points that are used in the reconstruction. In the example shown in FIG. 9, sample points zero, one, and three are present.

As per the Lagrange interpolation process, system 118 can then directly multiply these basis polynomials with the sample points and add the results together to obtain the coefficients of the original polynomials $P_i$, which correspond to the bytes in the original packet. The decoder then directly rebuilds the original packet by putting the coefficients into a buffer.

Figure 10:
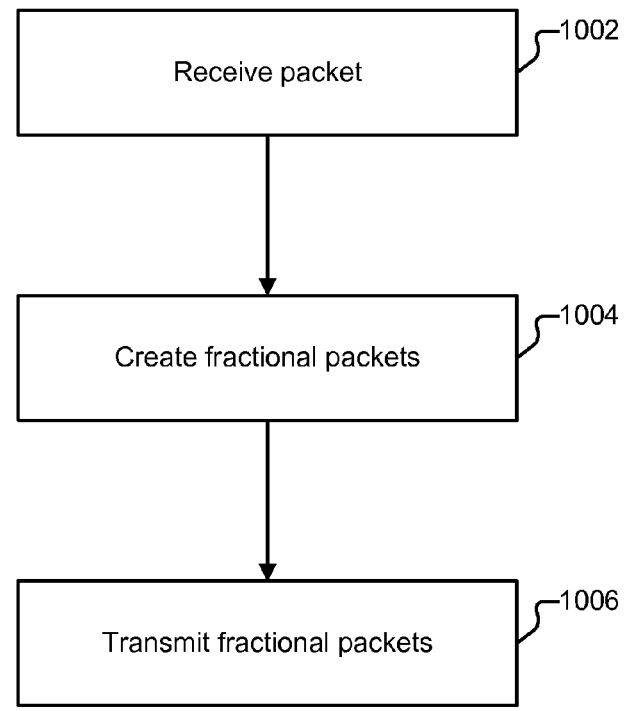
FIG. 10 illustrates an example of a process for creating fractional packets.

FIG. 10 illustrates an example of a process for creating fractional packets. In some embodiments the process shown in FIG. 10 is performed by application 406. The process begins at 1002 when a packet is received. For example, at 1002 a packet is received from application 404 by packet service 706. At 1004, one or more fractional packets are constructed from the received packet. For example, at 1004, the processing shown in FIG. 8 is performed. At 1006, the fractional packets are transmitted. For example, at 1006, one fractional packet is transmitted via each of the available links 802-808.

Figure 11:
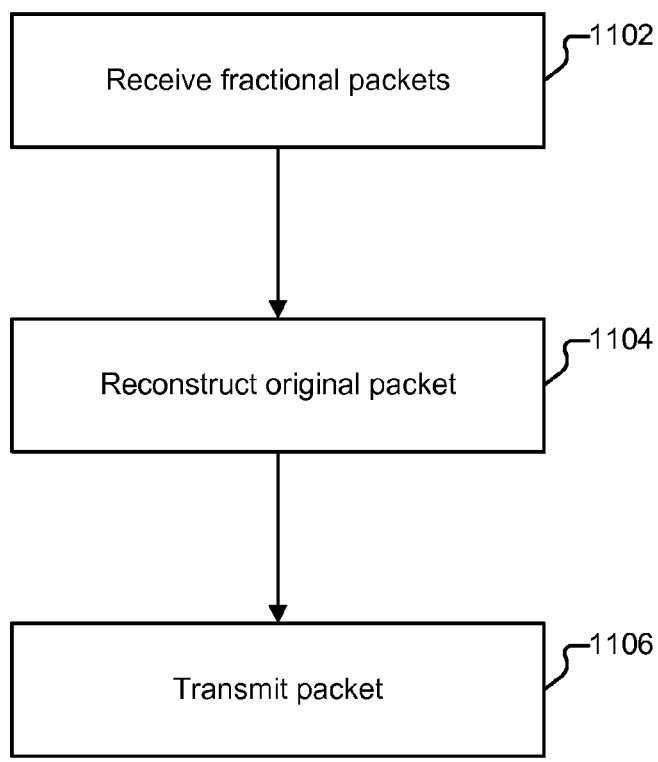
FIG. 11 illustrates an example of a process for reconstructing fractional packets.

FIG. 11 illustrates an example of a process for reconstructing fractional packets. In some embodiments the process shown in FIG. 11 is performed by system 118. The process begins at 1102 when fractional packets are received. For example, at 1102 a fractional packet is received from link 802 and another is received from link 804. Once a sufficient number of fractional packets have been received, at 1104, the original packet is reconstructed. For example, once a fractional packet is received from link 808, per the example shown in FIG. 9, the original packet can be reconstructed at 1104. At 1106, the original packet is transmitted. For example, if the packet is intended for website 120, at 1106 the packet is transmitted to website 120.

Figure 12:
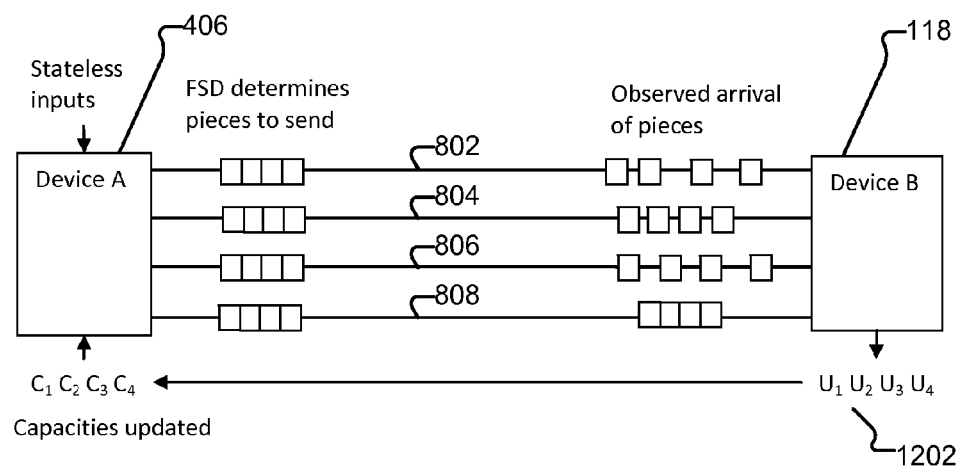
FIG. 12 illustrates an example of a fractional split decision and link performance feedback loop.

FIG. 12 illustrates an example of a fractional split decision and link performance feedback loop. Using the techniques described herein, application 406 is able to respond in real-time to changes in the capacities of the links. In some embodiments application 406 decides how to split packets based on stateful and stateless information that it maintains for each link. One example of such a decision process is one that stores estimated link capacities $C_1, C_2, \ldots C_j$ for each of the j links. This stateful data is combined with stateless inputs such as a target loss factor used by a fractional split decision (FSD) algorithm which determines the number and size of the pieces to be sent on each link.

At any one time, the fractional encoder maintains a best estimate of link capacities $C_1, C_2, \ldots C_j$ corresponding to the j links. As fractional packets are sent from application 406 to system 118, the receiver (system 118) is responsible for examining the packets as they arrive for information to aid in refining the capacity estimates. This can be done using a variety of techniques such as inter-packet arrival timing by identifying packet trains, or simple time averaging of data arrival, etc.

The end result of the receiver-side analysis is link capacity update information for each link $U_1, U_2, \ldots, U_j$ as shown at 1202. This information is sent from system 118 back to application 406, which then applies this information to update the estimated link capacities.

FIG. 13 illustrates information used in determining a fractional split. The information shown illustrates a sample case in which an input packet of size 1000 is to be split over four links whose estimated capacities (e.g., as determined by the process described in conjunction with FIG. 7) are 2.0, 1.0, 0.5 and 0.5 Mbits/sec respectively, as shown in region 1302.

The process begins by normalizing the link capacities with respect to the fastest link. In this case, the relative capacities are 1.0, 0.5, 0.25, and 0.25, as shown in region 1304.

In the example shown, a static estimated loss rate and loss target is used. Accordingly, an allowed splits table of (n,m) fractional splits is built that satisfies the loss criteria. Specifically, for each integer value of m pieces to send out, the value n<=m is determined such that the probability of having at least n/m packets arrive is greater than the target threshold. This value may be computed based on the cumulative binomial distribution.

In the example shown, an estimated loss rate of 0.001 per packet has been selected, which indicates that 1 out of every 1000 packets will be dropped. The loss target is 0.00001, indicating that it is desired that effectively only 1 out of every 100000 packets lose enough data so as to prevent reassembly. The first few values of the allowed splits table are shown in region 1306. The first pair (1,2) indicates that if two pieces are sent, each of them must be the full data (i.e., divided by 1) to satisfy the loss target. The second pair (2,3) indicates that if three pieces are sent, each of the pieces could be half the size (i.e., divided by 2) and the loss requirement would be met.

In some embodiments performing a fractional split decision includes the use of a greedy solver that incrementally adds more pieces until it finds the minimum global constraint among all the links. The process begins by assigning zero packets to every link, and then computes for each possible way to add one additional packet, the effective dimensionless time it would take for all the data to reach the other end.

FIG. 14 illustrates an example of the first iteration of a process for performing a fractional split decision. In the example shown, beginning with an initial solution of zero packets on each link, each possible allocation of one additional packet is explored. Note that based on the selected loss criteria in this example, there is no way to satisfy the loss requirements if a single piece is sent. For purposes of illustration, however, assume that the single piece is not split at all (i.e., the fraction is 1).

In the first case (1402), allocating the packet to the first link will result in 1 piece of 1000 bytes sent on the first link and zero on the rest. Since the first link has relative speed 1.0, this will take 1.0 relative units of time to transfer. This is computed as (bytes to send/original bytes)*(1/link capacity). For the other links, the 0 bytes sent will take 0.0 units of time to transfer, and thus the overall time required for this allocation is the maximum time required on each link, which is 1.0.

In the second case (1404), allocating the packet to the second link results in there being 1 piece of 1000 bytes sent on the second link and zero on the rest. With a relative speed of 0.5, it will take the second link 2.0 relative units of time to transfer the pieces. As in the first case, the other links will require 0.0 units of time to transfer 0 bytes. Thus the time required for this allocation is 2.0.

The third (1406) and fourth (1408) cases are similar, but with a relative speed of 0.25, each case results in a required time of 4.0. Therefore, the best greedy allocation choice is to allocate the packet to the first link so that the smallest effective time required to transfer the data is used. This solution is denoted as (1,0,0,0)-1.0.

Figure 15:
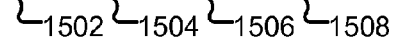
FIG. 15 illustrates an example of the second iteration of a process for performing a fractional split decision.

FIG. 15 illustrates an example of the second iteration of a process for performing a fractional split decision. The example shown repeats the processing described in conjunction with FIG. 9. In this example, the current solution is (1,0,0,0) and the table of allowed splits indicates that for two pieces, each of them must be full size to meet the loss requirements. An exploration of the four possible allocations for the next piece is performed. They are denoted as configurations (2,0,0,0), (1,1,0,0), (1,0,1,0), and (1,0,0,1).

In the first case (1502), two packets of size 1000 are assigned to the first link, so the effective time required to send the 2000 bytes over the 1.0 capacity link is 2.0. In the second case (1504), one packet of size 1000 is sent on the first link and one packet of size 1000 is sent on the second link. The first link's effective time is 1.0 and the second link's effective time is 2.0, so the effective time to transfer is 2.0.

Similarly, for the third (1506) and fourth (1508) cases, the effective time is 4.0. The best solution using two pieces is therefore (2,0,0,0), yielding an effective time of 2.0. While this is larger than the effective time of the previous solution (1,0,0,0), the previous solution (using a single piece) does not meet the loss criteria and so the new solution, denoted (2,0,0,0)-2.0 is stored as the new overall best solution.

Figure 16:
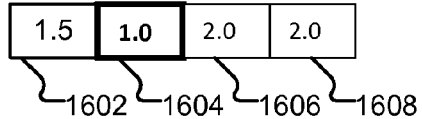
FIG. 16 illustrates an example of an additional iteration of a process for performing a fractional split decision.

FIG. 16 illustrates an example of an additional iteration of a process for performing a fractional split decision. As in previous iterations, the process begins with the solution of the previous iteration (2,0,0,0) and examines the solutions with one additional packet—(3,0,0,0), (2,1,0,0), (2,0,1,0), and (2,0,0,1). The allowed split factors table indicates that for three pieces, each of the pieces can be half the size (divided by factor of 2). Therefore, each piece now has a size of 500 bytes instead of the full 1000.

In the first case (1602), 3×500 byte pieces are sent on the first link, for a total of 1500 bytes being sent over a 1.0 capacity link. This results in an effective time of 1.5. In the second case (1604), 2×500 byte pieces are sent on the first link of capacity 1.0, and 1×500 byte packet is sent on the second link of capacity 0.5. Thus, the required time for the first and second links is 1.0.

In the third (1606) and fourth (1608) cases, the required time is 2.0. Thus, the best greedy solution with three pieces is (1,1,0,0), which results in an effective time of 1.0. Since this time is less than the previous best overall solution of (2,0,0,0)-2.0, the new solution is saved as the overall best one.

Iteration may proceed up to an arbitrary number of pieces, and the end result is designated as the global optimal split decision that determines the split factor and number of pieces to create as well as the number of pieces to send on each link.

FIG. 17A illustrates an example of a fractional split decision made with a target loss of 1.0%. FIG. 17B illustrates an example of a fractional split decision made with target loss of 0.0001%. FIGS. 17A and 17B illustrate how QOS parameters may affect a fractional split decision. In FIGS. 17A and 17B, respectively, the links have normalized speeds of 1.0 and 0.5. In both cases, the estimated probability of loss of a single packet is 0.1% or 0.001. The difference between the two cases is that the first uses a target loss probability of 0.01 or 1% while the second uses a target loss probability of 0.0001%.

As illustrated in FIGS. 17A and 17B, respectively, the example greedy split decision is carried out as previously described. For compactness, only the first six iterations of the greedy algorithm are shown. Note that the differing value for target loss in each case affects the allowed splits, which in turn affects the maximum possible split factor used at each iteration of the algorithm.

Applying the fractional split decision algorithm with a target loss of 1% results in an encoder being able to split input packets as finely as the number of packets it chooses to create, as indicated by the allowed splits table. For example, the (5,5) entry in FIG. 17A indicates that if the encoder sends five pieces, each can carry a fifth of the input packet's data and still satisfy the loss requirement. On the other hand, the (5,3) entry in FIG. 17B indicates that if five pieces are sent, each must carry a third of the input packet's data in order to satisfy the target loss of 0.0001% used in FIG. 17B.

FIG. 17A shows that with a target loss of 1%, the optimal split is (2,1), with each of the pieces carrying a third of the original data. This results in each packet taking ⅔ of the time to be sent, increasing total capacity by 50%. On the other hand, FIG. 17B shows that with a target loss of 0.0001%, the optimal split is (4,2), which results in each packet taking the same time to be sent as the original input packet, but meets the much stricter loss requirements.

FIG. 18 illustrates an embodiment of an interface for managing aggregate communications. In various embodiments, interface 1800 is presented to Alice when she launches application 406, accesses a status webpage, clicks on an icon in her toolbar, loads an application on tablet 104 or smartphone 106, etc. The interface is both touch-interface and mouse/keyboard friendly for a consistent cross-device experience.

Alice can enable or disable connection aggregation by toggling button 1802.

If Alice clicks on tab 1804, she will be presented with a dashboard in her default browser. The dashboard displays information such as Alice's monthly usage/charges with respect to any carriers associated with her networking devices. The dashboard also displays historical usage information, projections on when Alice will meet any set thresholds (e.g., 5 GB of usage on a particular link), etc. In various embodiments, Alice can configure application 406 remotely, via the dashboard, and/or can configure links.

If Alice clicks on tab 1806, she will be presented with a settings menu, where she can set various preferences, such as to prefer low latency, prefer low cost, use a particular device only until a certain dollar amount or other usage is reached, then stop using it, etc.

Region 1808 is a real-time display of the upload and download throughput resulting from Alice's internet usage.

Region 1810 reports a metric that summarizes the quality of the aggregated connection and is updated in real time.

Region 1812 lists each of the individual links available for aggregation. Alice can elect to use all, or a subset of the available links. One example link is shown in region 1814.

Alice can turn a given link on or off (i.e., indicating whether it should be used for aggregation) by toggling button 1816.

Metadata associated with a given link is shown in region 1818. Examples of such information include (if applicable): Link type, link provider, link phone number, link name, link encryption, link channel, link connection status, link model, link unique identifier, and link billing cycle dates.

A real time display of the signal quality of a given link, in dBm, is shown in region 1820. In the example shown, signal quality is also segmented into five discrete display bars.

A session usage meter is depicted in region 1822. The meter displays, in real time, how much bandwidth has been used in one session (time between connecting and disconnecting via application 406). The display dynamically changes based on uplink type and usage limits.

In region 1824, a metric that summarizes the quality of the given link is displayed. The metric is updated in real time.

In region 1826, a real time display of a given link's download and upload throughput is provided.

In region 1828, a real time display of a given link's measured latency is provided.

If Alice clicks on control button 1830, a settings menu will open allowing her to configure settings specific to the applicable link. As one example, Alice can specify usage restrictions for the link via the settings menu.

As illustrated in region 1832, the information displayed for a given link can be different based on the type of link. The link in region 1832 corresponds to a wireless network, whereas the link in region 1814 corresponds to a USB modem.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
discover at least one existing telecommunications network device having an existing driver;
remove at least one of an existing device-to-driver mapping and an existing driver associated with the existing telecommunications network device;
install a new driver capable of communicating, using a common set of primitive commands, with the existing telecommunications network device and a second telecommunications network device, wherein the new driver is configured to coordinate the parallel operation of the existing and second telecommunications devices and aggregate connectivity provided by the existing and second telecommunications network devices, and wherein the existing telecommunications network device and the second telecommunications network device are of different types; and
map the new driver to the existing device; and
a memory coupled to the processor and configured to provide the processor with instructions.

2. The system of claim 1 wherein the existing network device is a USB device and wherein the set of primitive commands includes USB commands.

3. The system of claim 1 wherein the processor is configured to perform the removing after receiving permission from a user.

4. The system of claim 1 wherein the existing network device is a composite USB device having multiple interfaces and wherein installing the new driver includes installing a driver for the base device and not installing additional drivers for additional interfaces of the composite USB device.

5. The system of claim 1, wherein the existing network device and the second network device are associated with respective first and second telecommunications links, and wherein the first and second telecommunications links are different.

6. The system of claim 1, wherein the existing network device and the second network device are associated with different vendors.

7. The system of claim 1, wherein the existing network device and the second network device are associated with different telecommunications providers.

8. A method, comprising:
discovering at least one existing telecommunications network device having an existing driver;
removing at least one of an existing device-to-driver mapping and an existing driver associated with the existing telecommunications network device;
installing a new driver capable of communicating, using a common set of primitive commands, with the existing telecommunications network device and a second telecommunications network device, wherein the new driver is configured to coordinate the parallel operation of the existing and second telecommunications devices and aggregate connectivity provided by the existing and second telecommunications network devices, and wherein the existing telecommunications network device and the second telecommunications network device are of different types; and mapping the new driver to the existing device.

9. The method of claim 8 wherein the existing network device is a USB device and wherein the set of primitive commands includes USB commands.

10. The method of claim 8 wherein performing the removing is preceded by receiving permission from a user.

11. The method of claim 8 wherein the existing network device is a composite USB device having multiple interfaces and wherein installing the new driver includes installing a driver for the base device and not installing additional drivers for additional interfaces of the composite USB device.

12. The method of claim 8, wherein the existing network device and the second network device are associated with respective first and second telecommunications links, and wherein the first and second telecommunications links are different.

13. The method of claim 8, wherein the existing network device and the second network device are associated with different vendors.

14. The method of claim 8, wherein the existing network device and the second network device are associated with different telecommunications providers.

* * * * *